United States Patent
Fathi et al.

(10) Patent No.: US 11,965,728 B2
(45) Date of Patent: Apr. 23, 2024

(54) INTELLIGENT PIPING INSPECTION MACHINE

(71) Applicant: Saudi Arabian Oil Company, Dhahran (SA)

(72) Inventors: Mazin M. Fathi, Dammam (SA); Yousef Adnan Rayes, Seoul (KR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 614 days.

(21) Appl. No.: 17/223,894

(22) Filed: Apr. 6, 2021

(65) Prior Publication Data

US 2022/0316858 A1     Oct. 6, 2022

(51) Int. Cl.
*G06T 7/70* (2017.01)
*G01B 11/02* (2006.01)
(Continued)

(52) U.S. Cl.
CPC .......... *G01B 11/02* (2013.01); *G01B 11/0616* (2013.01); *G01B 11/08* (2013.01);
(Continued)

(58) Field of Classification Search
CPC . G06T 2207/30108; G06T 7/001; G06T 7/40; G06T 7/70; G01N 21/84;
(Continued)

(56) References Cited

U.S. PATENT DOCUMENTS 6,996,914 B1    2/2006  Istre et al.
10,589,371 B2   3/2020  Rajagopalan et al.
(Continued)

FOREIGN PATENT DOCUMENTS

CN    105387812 A  *  3/2016
CN    105387812 A     3/2016
(Continued)

OTHER PUBLICATIONS

International Search Report and Written Opinion in corresponding PCT Application No. PCT/US2022/071293 (includes English translations for CN105387812 and KR102192733), dated Jul. 15, 2022; 40 pages.

*Primary Examiner* — Matthew C Bella
*Assistant Examiner* — Janice E. Vaz
(74) *Attorney, Agent, or Firm* — Leason Ellis LLP

(57) ABSTRACT

An automated method of inspecting a pipe includes: positioning the pipe with respect to a laser scanner using a positioning apparatus; scanning a size of the positioned pipe by the laser scanner; identifying a specification and historical data of the pipe's type by inputting the scanned size to an artificially intelligent module trained through machine learning to match input size data to standardized pipe types and output corresponding specifications and historical data of the pipe types; scanning dimensions of the positioned pipe by the laser scanner using a dimension portion of the identified historical data; comparing the scanned dimensions with standard dimensions from the identified specification; detecting a dimension nonconformity when the scanned dimensions are not within acceptable tolerances of the standard dimensions; and in response to detecting the dimension nonconformity, generating an alert and updating the dimension portion of the identified historical data to reflect the detected dimension nonconformity.

20 Claims, 4 Drawing Sheets

(51) Int. Cl.
*G01B 11/06* (2006.01)
*G01B 11/08* (2006.01)
*G01M 3/22* (2006.01)
*G01N 21/84* (2006.01)
*G01N 29/44* (2006.01)
*G06N 20/00* (2019.01)
*G06T 7/00* (2017.01)
*G06T 7/40* (2017.01)
*H04N 23/60* (2023.01)

(52) U.S. Cl.
CPC .............. *G01M 3/22* (2013.01); *G01N 21/84* (2013.01); *G01N 29/4427* (2013.01); *G06N 20/00* (2019.01); *G06T 7/001* (2013.01); *G06T 7/40* (2013.01); *G06T 7/70* (2017.01); *H04N 23/60* (2023.01); *G01N 2021/8455* (2013.01); *G06T 2207/30108* (2013.01)

(58) Field of Classification Search
CPC ....... G01N 29/4427; G01N 2021/8455; G06N 20/00; G01M 3/22; G01B 11/0616; G01B 11/02; G01B 11/08; H04N 23/60
See application file for complete search history.

(56) References Cited

U.S. PATENT DOCUMENTS

| | | |
|---|---|---|
| 2010/0191376 A1 | 7/2010 | Close et al. |
| 2018/0326439 A1 | 11/2018 | Weisenberg et al. |
| 2023/0101112 A1* | 3/2023 | Aguilar ................ G06V 10/82 |
| | | 382/156 |

FOREIGN PATENT DOCUMENTS

| | | |
|---|---|---|
| CN | 108131568 A | 6/2018 |
| KR | 20030016029 A | 2/2003 |
| KR | 102192733 B1 | 12/2020 |

* cited by examiner

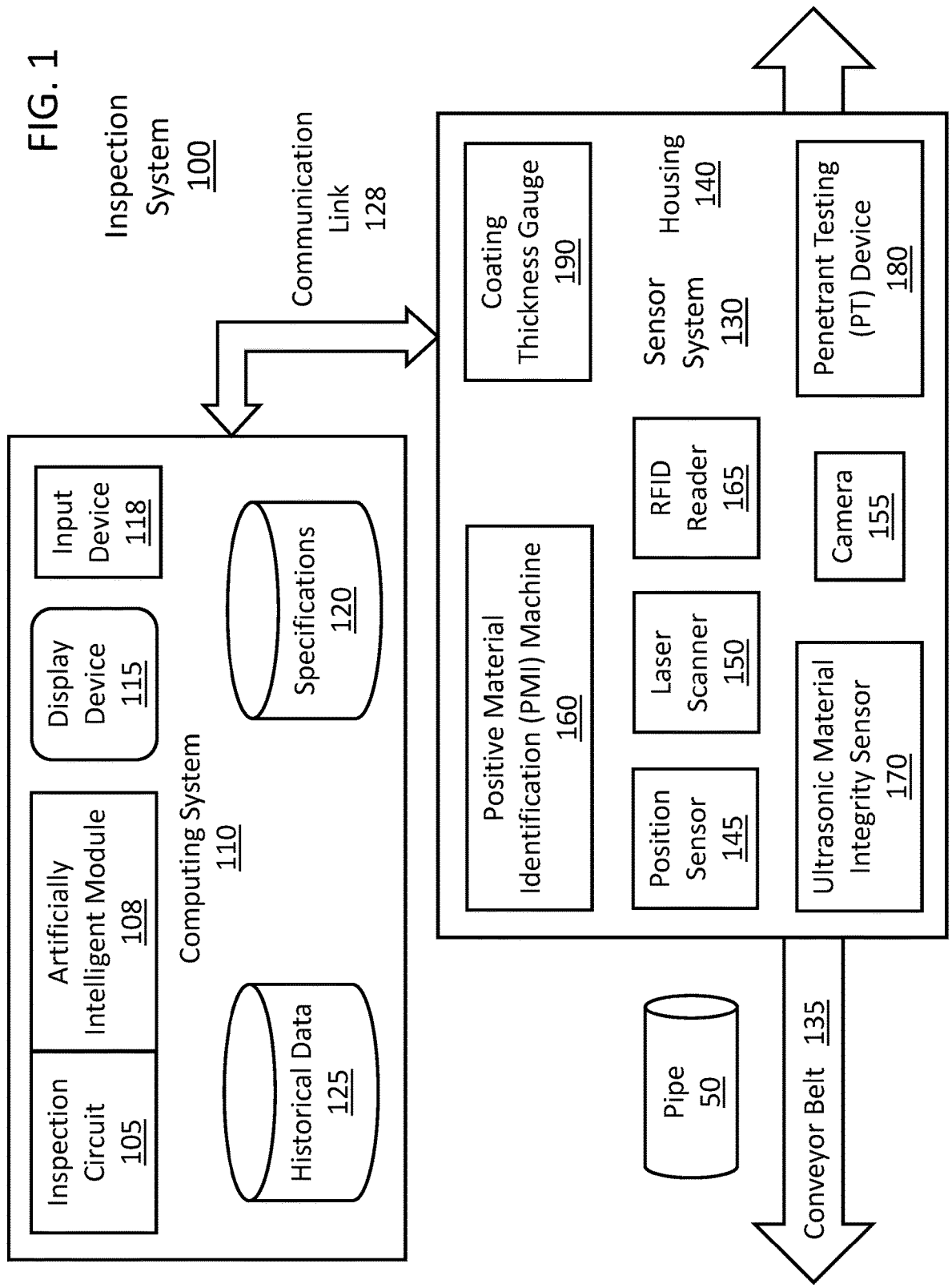

Repeat controlling, comparing, detecting, and alerting/updating for different inspections of pipe using corresponding inspection devices, portions of identified historical data, and standards in identified specification (e.g., material composition, material integrity, penetrant testing, coating thickness)
270

⎫ PMI Machine 160,
⎬ Material Integrity Sensor 170,
⎭ PT Device 180,
Coating Thickness Gauge 190

↓

Use detected previous nonconformities of identified historical data to adjust controlling of present inspections of pipe in order to detect more such previous nonconformities
280

⎫
⎬ Inspection Circuit 105
⎭

↓

Update identified historical data to reflect any detected present nonconformities such that future inspections of further pipes of pipe type are more likely to detect further such present nonconformities than if no such updating took place
290

⎫
⎬ Historical Data Database 125
⎭

↓

End

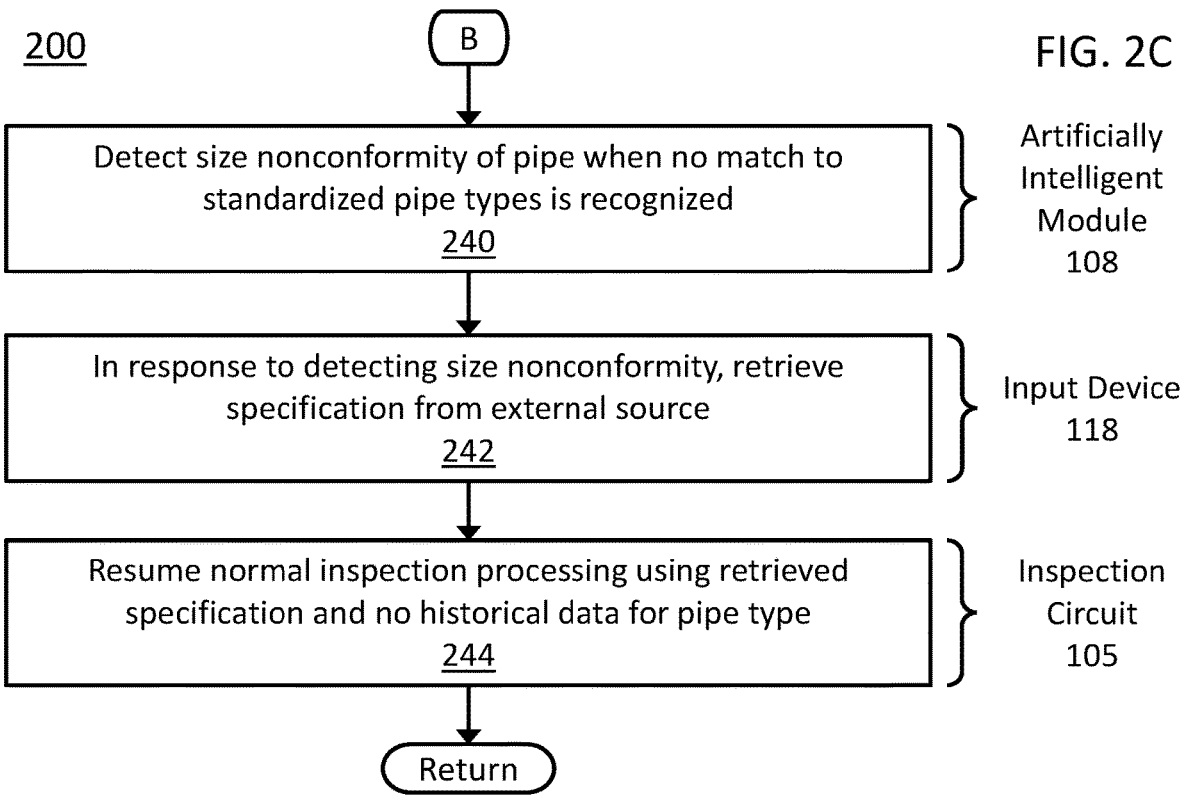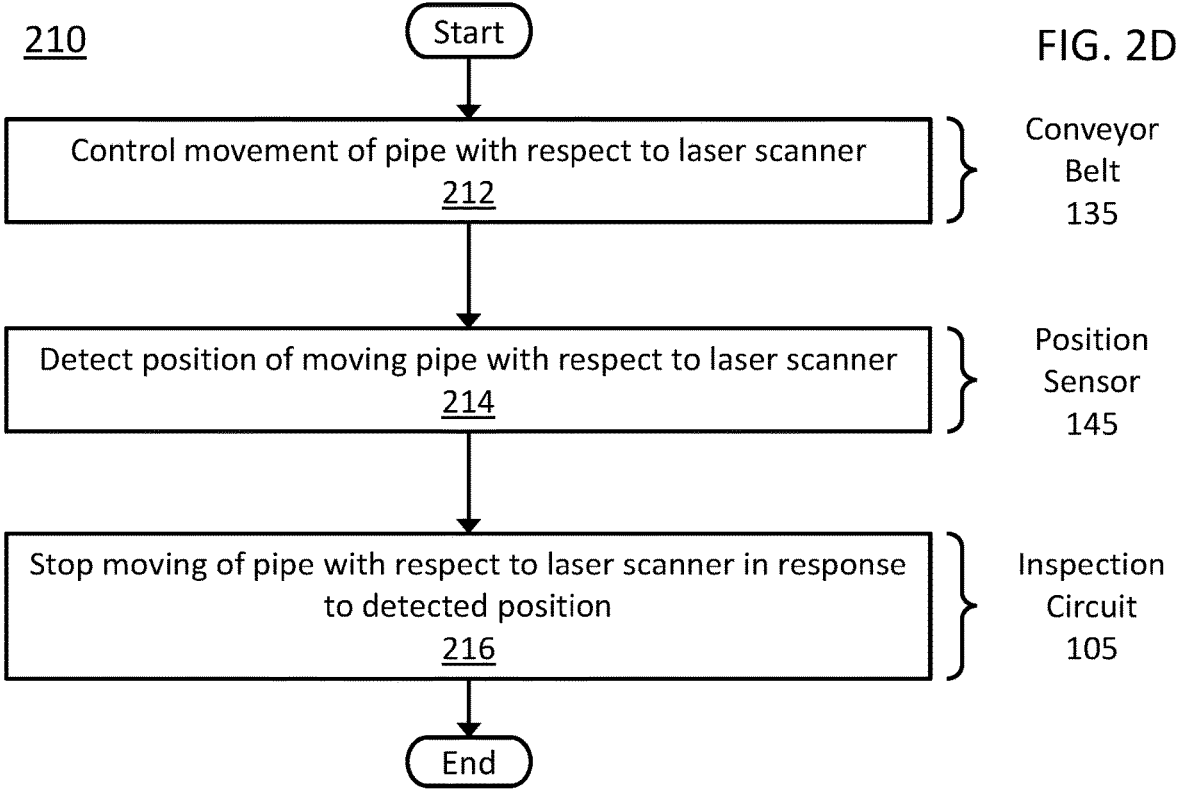

INTELLIGENT PIPING INSPECTION MACHINE

FIELD OF THE DISCLOSURE

The present disclosure relates to a method and system for automated inspection of a pipe using artificial intelligence.

BACKGROUND OF THE DISCLOSURE

Petroleum is an essential component of everyday life and is the economic backbone for many countries. To this end, piping integrity is important to ensuring the delivery of high quality petroleum and petrochemical products to processing facilities, distributors, and end users. The pipes that make up piping systems are typically inspected by human inspectors after manufacturing. However, this has a high risk of delivering defective pipes to construction project sites. The inspection process also consumes a lot of time, resources, and efforts, and it cannot guarantee that a thorough inspection has been performed by the inspectors. This can be caused by a variety of factors, such as human mistakes or inspection machine deficiencies. Human mistakes include improper inspection activity such as utilizing outdated standards requirements, lack of experience in a specific or pertinent technical field, and behavioral concerns such as emotional issues or fatigued inspectors. Machine deficiencies include damaged or improper measurement tools and outdated machine calibration and materials. Delivering defective pipes to end-users can be quite disruptive, especially for long-lead procurement items or critical path activities that represent milestones for construction progress. Such disruption has a major impact on project schedule and cost, in addition to causing customer dissatisfaction and other impediments to business sustainability.

It is in regard to these and other problems in the art that the present disclosure is directed to provide a technical solution for an effective method and system for automated inspection of a pipe using artificial intelligence.

SUMMARY OF THE DISCLOSURE

According to a first aspect of the disclosure, an automated method of inspecting a pipe using artificial intelligence is provided. The method comprises: positioning the pipe with respect to a laser scanner using a positioning apparatus; controlling, by an inspection circuit, a scanning of a size of the positioned pipe by the laser scanner; identifying, by the inspection circuit, a specification and historical data of a type of the pipe by inputting the scanned size to an artificially intelligent module trained through machine learning to match input size data to standardized pipe types and output corresponding specifications and historical data of the standardized pipe types from a non-transitory memory device; controlling, by the inspection circuit, a scanning of dimensions of the positioned pipe by the laser scanner using the scanned size and a dimension portion of the identified historical data; comparing, by the inspection circuit, the scanned dimensions with standard dimensions from the identified specification; detecting, by the inspection circuit, a dimension nonconformity of the pipe when the scanned dimensions are not within acceptable tolerances of the standard dimensions; and in response to detecting the dimension nonconformity, generating, by the inspection circuit, an alert, and updating, by the inspection circuit, the memory device to reflect the detected dimension nonconformity in the dimension portion of the identified historical data.

In an embodiment consistent with the above, the identified historical data comprises nonconformities of pipes of the pipe type detected from previous inspections of the pipes, and the method further comprises: using, by the inspection circuit, the detected previous nonconformities of the identified historical data to adjust controlling of present inspections of the pipe in order to detect more such previous nonconformities; and updating, by the inspection circuit, the memory device to reflect any detected present nonconformities in the identified historical data such that future inspections of further pipes of the pipe type are more likely to detect further such present nonconformities than if no such updating took place.

In an embodiment consistent with the above, the method further comprises: controlling, by the inspection circuit, an inspection of the material composition of the pipe by a positive material identification (PMI) machine using the scanned size and a material composition portion of the identified historical data; comparing, by the inspection circuit, the inspected material composition with a standard material composition from the identified specification; detecting, by the inspection circuit, a material composition nonconformity of the pipe when the inspected material composition is not within acceptable tolerances of the standard material composition; and in response to detecting the material composition nonconformity, generating, by the inspection circuit, an alert, and updating, by the inspection circuit, the memory device to reflect the detected material composition nonconformity in the material composition portion of the identified historical data.

In an embodiment consistent with the above, the method further comprises: controlling, by the inspection circuit, an inspection of a material integrity of the pipe by an ultrasonic material integrity sensor using the scanned size and a material integrity portion of the identified historical data; comparing, by the inspection circuit, the inspected material integrity with a standard material integrity from the identified specification; detecting, by the inspection circuit, a material integrity nonconformity of the pipe when the inspected material integrity is not within acceptable tolerances of the standard material integrity; and in response to detecting the material integrity nonconformity, generating, by the inspection circuit, an alert, and updating, by the inspection circuit, the memory device to reflect the detected material integrity nonconformity in the material integrity portion of the identified historical data.

In an embodiment consistent with the above, the method further comprises: controlling, by the inspection circuit, a penetrant testing (PT) inspection of the pipe by a PT device and a camera using the scanned size and a PT portion of the identified historical data; comparing, by the inspection circuit, the PT inspection of the pipe with a standard PT inspection from the identified specification; detecting, by the inspection circuit, a PT nonconformity of the pipe when the PT inspection of the pipe is not within acceptable tolerances of the standard PT inspection; and in response to detecting the PT nonconformity, generating, by the inspection circuit, an alert, and updating, by the inspection circuit, the memory device to reflect the detected PT nonconformity in the PT portion of the identified historical data.

In an embodiment consistent with the above, the method further comprises: controlling, by the inspection circuit, a coating thickness inspection of the pipe by a coating thickness gauge using the scanned size and a coating thickness portion of the identified historical data; comparing, by the inspection circuit, the inspected coating thickness with a standard coating thickness from the identified specification; detecting, by the inspection circuit, a coating thickness nonconformity of the pipe when the inspected coating thickness is not within acceptable tolerances of the standard coating thickness; and in response to detecting the coating thickness nonconformity, generating, by the inspection circuit, an alert, and updating, by the inspection circuit, the memory device to reflect the detected coating thickness nonconformity in the coating thickness portion of the identified historical data.

In an embodiment consistent with the above, the artificially intelligent module is further trained to recognize when the input size data does not match to any of the standardized pipe types, and the method further comprises: detecting, by the inspection circuit, a size nonconformity of the pipe when such a mismatch is recognized by the artificially intelligent module; and in response to detecting the size nonconformity, retrieving, by the inspection circuit, the specification from an external source.

In an embodiment consistent with the above, the positioning apparatus comprises a conveyor belt and a position sensor, the pipe is on the conveyor belt, and positioning the pipe with respect to the laser scanner comprises: controlling, by the inspection circuit, movement of the pipe with respect to the laser scanner using the conveyor belt; detecting, by the inspection circuit, a position of the moving pipe with respect to the laser scanner using the position sensor; and stopping, by the inspection circuit, the moving of the pipe with respect to the laser scanner in response to the detected position.

According to another aspect of the disclosure, a system for automated inspection of a pipe using artificial intelligence is provided. The system comprises: a housing; a positioning apparatus configured to position the pipe with respect to the housing; a laser scanner coupled to the housing and configured to scan a size and dimensions of the positioned pipe; a camera coupled to the housing and configured to capture images of the positioned pipe; an artificially intelligent module trained through machine learning to match input size data to standardized pipe types and output corresponding specifications and historical data of the standardized pipe types from a non-transitory memory device; and an inspection circuit. The inspection circuit is configured to: control the scanning of the size of the positioned pipe by the laser scanner and the capturing of images of the positioned pipe by the camera; identify a specification and historical data of a type of the pipe by inputting the scanned size to the artificially intelligent module; control the scanning of the dimensions of the positioned pipe by the laser scanner using the scanned size and a dimension portion of the identified historical data; compare the scanned dimensions and the captured images with standard dimensions from the identified specification; detect a dimension nonconformity of the pipe when the scanned dimensions or the captured images are not within acceptable tolerances of the standard dimensions; and in response to detecting the dimension nonconformity, generate an alert and update the memory device to reflect the detected dimension nonconformity in the dimension portion of the identified historical data.

In an embodiment consistent with the system described above, the identified historical data comprises nonconformities of pipes of the pipe type detected from previous inspections of the pipes, and the inspection circuit is further configured to: use the detected previous nonconformities of the identified historical data to adjust controlling of present inspections of the pipe in order to detect more such previous nonconformities; and update the memory device to reflect any detected present nonconformities in the identified historical data such that future inspections of further pipes of the pipe type are more likely to detect further such present nonconformities than if no such updating took place.

In an embodiment consistent with the system described above, the system further comprises a positive material identification (PMI) machine coupled to the housing and configured to inspect a material composition of the pipe, wherein the inspection circuit is further configured to: control the inspection of the material composition of the pipe by the PMI machine using the scanned size and a material composition portion of the identified historical data; compare the inspected material composition with a standard material composition from the identified specification; detect a material composition nonconformity of the pipe when the inspected material composition is not within acceptable tolerances of the standard material composition; and in response to detecting the material composition nonconformity, generate an alert and update the memory device to reflect the detected material composition nonconformity in the material composition portion of the identified historical data.

In an embodiment consistent with the system described above, the system further comprises an ultrasonic material integrity sensor coupled to the housing and configured to inspect a material integrity of the pipe, wherein the inspection circuit is further configured to: control the inspection of the material integrity of the pipe by the ultrasonic material integrity sensor using the scanned size and a material integrity portion of the identified historical data; compare the inspected material integrity with a standard material integrity from the identified specification; detect a material integrity nonconformity of the pipe when the inspected material integrity is not within acceptable tolerances of the standard material integrity; and in response to detecting the material integrity nonconformity, generate an alert and update the memory device to reflect the detected material integrity nonconformity in the material integrity portion of the identified historical data.

In an embodiment consistent with the system described above, the system further comprises a penetrant testing (PT) device coupled to the housing and configured to perform a PT inspection of the pipe with the camera, wherein the inspection circuit is further configured to: control the PT inspection of the pipe by the PT device and the camera using the scanned size and a PT portion of the identified historical data; compare the PT inspection of the pipe with a standard PT inspection from the identified specification; detect a PT nonconformity of the pipe when the PT inspection of the pipe is not within acceptable tolerances of the standard PT inspection; and in response to detecting the PT nonconformity, generate an alert and update the memory device to reflect the detected PT nonconformity in the PT portion of the identified historical data.

In an embodiment consistent with the system described above, the system further comprises a coating thickness gauge coupled to the housing and configured to perform a coating thickness inspection of the pipe, wherein the inspection circuit is further configured to: control the coating thickness inspection of the pipe by the coating thickness gauge using the scanned size and a coating thickness portion of the identified historical data; compare the inspected coating thickness with a standard coating thickness from the identified specification; detect a coating thickness nonconformity of the pipe when the inspected coating thickness is not within acceptable tolerances of the standard coating thickness; and in response to detecting the coating thickness nonconformity, generate an alert and update the memory device to reflect the detected coating thickness nonconformity in the coating thickness portion of the identified historical data.

In an embodiment consistent with the system described above, the artificially intelligent module is further trained to recognize when the input size data does not match to any of the standardized pipe types, and the inspection circuit is further configured to: detect a size nonconformity of the pipe when such a mismatch is recognized by the artificially intelligent module; and in response to detecting the size nonconformity, retrieve the specification from an external source.

In an embodiment consistent with the system described above, the positioning apparatus comprises: a conveyor belt configured to move the pipe with respect to the housing; and a position sensor coupled to the housing and configured to detect a position of the moving pipe with respect to the housing, wherein the inspection circuit is further configured to control the conveyor belt in order to move the pipe with respect to the housing, and to stop the moving of the pipe with respect to the housing in response to the detected position.

According to yet another aspect of the disclosure, a non-transitory computer readable medium (CRM) having computer instructions stored therein that, when executed by a processing circuit, cause the processing circuit to carry out an automated process of inspecting a pipe using artificial intelligence. The process comprises: controlling a scanning of a size and an appearance of the pipe by a laser scanner and a camera, the pipe having been positioned with respect to the laser scanner and the camera using a positioning apparatus; identifying a specification and historical data of a type of the pipe by inputting the scanned size and appearance to an artificially intelligent module trained through machine learning to match input size and appearance data to standardized pipe types and output corresponding specifications and historical data of the standardized pipe types from a non-transitory memory device; controlling a scanning of dimensions of the positioned pipe by the laser scanner using the scanned size and a dimension portion of the identified historical data; comparing the scanned dimensions with standard dimensions from the identified specification; detecting a dimension nonconformity of the pipe when the scanned dimensions are not within acceptable tolerances of the standard dimensions; and in response to detecting the dimension nonconformity, generating an alert and updating the memory device to reflect the detected dimension nonconformity in the dimension portion of the identified historical data.

In an embodiment consistent with the CRM described above, the identified historical data comprises nonconformities of pipes of the pipe type detected from previous inspections of the pipes, and the process further comprises: using the detected previous nonconformities of the identified historical data to adjust controlling of present inspections of the pipe in order to detect more such previous nonconformities; and updating the memory device to reflect any detected present nonconformities in the identified historical data such that future inspections of further pipes of the pipe type are more likely to detect further such present nonconformities than if no such updating took place.

In an embodiment consistent with the CRM described above, the process further comprises: controlling an inspection of a material integrity of the pipe by an ultrasonic material integrity sensor using the scanned size and a material integrity portion of the identified historical data; comparing the inspected material integrity with a standard material integrity from the identified specification; detecting a material integrity nonconformity of the pipe when the inspected material integrity is not within acceptable tolerances of the standard material integrity; and in response to detecting the material integrity nonconformity, generating an alert and updating the memory device to reflect the detected material integrity nonconformity in the material integrity portion of the identified historical data.

In an embodiment consistent with the CRM described above, the positioning apparatus comprises a conveyor belt and a position sensor, the pipe is on the conveyor belt, and the process further comprises positioning the pipe with respect to the laser scanner using the positioning apparatus by: controlling movement of the pipe with respect to the laser scanner using the conveyor belt; detecting a position of the moving pipe with respect to the laser scanner using the position sensor; and stopping the moving of the pipe with respect to the laser scanner in response to the detected position.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 1 is a block diagram of an example system for automated inspection of a pipe using artificial intelligence, according to an embodiment.

FIGS. 2A-2D are flow diagrams of an example method for automated inspection of a pipe using artificial intelligence, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 2A:
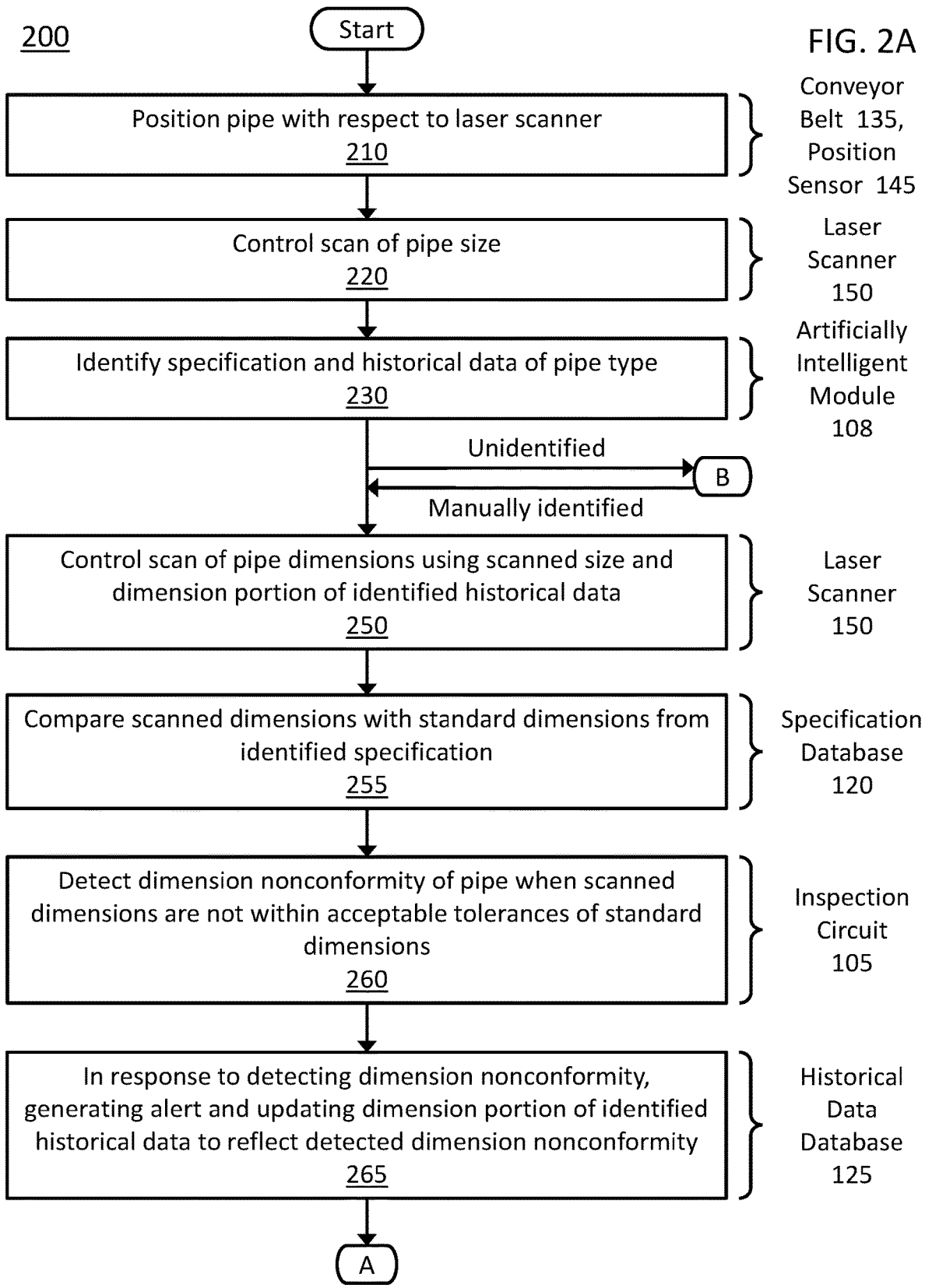

Example embodiments of the present disclosure are directed to employing artificial intelligence to integrate historical records of incidents of pipe types together with sufficient technical standards of the pipe types in order to synchronize the two databases as a guiding tool for manufacturing defect-free pipelines. Some such embodiments provide for different reliable automated and integrated inspection mechanisms. In some such embodiments, these different integrated inspection mechanisms crosscheck and verify the measured values provided by each tool. Some disclosed techniques help mitigate material defects during manufacturing and inspection, and before installation, through comparisons against historical material and dimensional shortfalls and against technical standards for manufacturing and inspection.

As discussed earlier, manufacturing defects, such as improper welding, heat treatment, cooling, machining, or cutting, can result in defective pipes being manufactured. These defective pies are then sometimes released to end users because of inadequate inspection of the pipes before being released. This can result in costly scenarios such as failed piping systems or construction delays.

In order to address these and other deficiencies in the art, example embodiments of the present disclosure are directed to an artificial intelligent inspection machine for performing pipe inspection. Some embodiments employ artificial intelligence (e.g., machine learning) to match a variety of different pipe types being inspected to an integration of corresponding technical standards and historical incidents of deficient pipes in order to tailor the particular inspection being performed to the particular type of pipe being inspected. This allows the inspection to factor on the desired characteristics and the known weaknesses of previous examples of the pipe being inspected. The inspection is automated, using various sensors under the control of an inspection circuit (e.g., suitable computing device), which is programmed or otherwise configured to control the inspection steps. The integration of sufficient technical standards with a comprehensive database of historical defects serves as a guiding tool for the manufacture of defect-free pipelines, and provides reliable automated and integrated inspection mechanisms.

In example embodiments of the present disclosure, an artificially intelligent tool conducts visual, dimensional, and compositional inspections of a pipe. In some such embodiments, an inspection system does automatic pipe inspection including verification of length, straightness, outside circumference, wall thickness, out of roundness, peaking, bevel angel and root face, and bead height of grinding area and welded area. In some such embodiments, the system further performs non-destructive testing (NDT, such as ultrasonic testing) to determine material integrity and Positive Material Identification (PMI) activity to identify chemical composition percentages in the pipe material. In some such embodiments, a data analytics feature is used to collect and analyze the readings from the different inspection devices as well as to produce automatic reports that highlight areas of defects for continuous manufacturing and inspection improvements. In some such embodiments, the collected data is used to trigger an automatic proactive alarm notification to the manufacturer and end user, and is utilized to compare against future final inspection processes based on the recorded defects.

In example embodiments, an intelligent pipe inspection machine is configured (e.g., by code or other logic) to make sure each manufacturing step of a pipe is done properly and without any defects. The intelligent pipe inspection machine is programmed through artificial intelligence (e.g., trained and verified on training data of pipes of various types intended to be inspected) and further configured (e.g., by code, such as programmed) to automatically accumulate inspection test results in an integrated cloud server (or other non-transitory repository) from every inspection. Some of this accumulated data forms historical data for the particular type of pipe being inspected. This historical data can include a record of any nonconformity or deficiency of the pipe being inspected with respect to a recognized standard for the pipe type. For instance, such a nonconformity or deficiency can be any deviation from the standard that is significant enough to require, for example, alerting an operator (such as with an alarm), sending a proactive notification, fixing the pipe before further inspection, or otherwise disposing of the pipe as nonacceptable or deficient.

In some such embodiments, the inspection machine is configured (e.g., by code) to perform in-depth inspections of areas which exhibit previous nonconformities from other inspected pipes of the same type. Such inspection triggers can be based, for example, on criteria such as number of nonconformities in the area, percentage of nonconformities in the area, recentness of nonconformities in the area, or the like. In some embodiments, laser scanning (such as 3D laser scanning) and a camera (such as a visible wavelength camera) are used for visual recognition or dimensional inspection. In some such embodiments, visual or pipe type recognition is performed through an artificially intelligent module trained by machine learning techniques to recognize different pipe types based on scanned size dimensions. In some such embodiments, 3D laser scanning and captured image data are used to identify the pipe type to be inspected, and these findings are used to retrieve standardized records for the pipe type stored in, for example, the cloud server. In some such embodiments, dimensional inspection is performed by comparing scanned dimensional measurements to standard dimensional measurements of the recognized pipe type being inspected. In some such embodiments, 3D laser scanning data is used to determine the other inspection positions of the pipe automatically (e.g., as controlled by an inspection circuit configured by code or other logic to determine where to inspect the pipe for the particular recognized pipe type).

According to example embodiments, an integrated inspection machine for automated inspection of a pipe using artificial intelligence is provided. The machine is controlled by a hardware inspection circuit (such as a computer, electronic processor, or microprocessor) configured by code (e.g., software, firmware) or other logic (e.g., custom logic, such as a programmed gate array) to control and carry out the inspection. To this end, the inspection machine further includes numerous sensors, such as a radio frequency identification (RFID) reader, a laser scanner, a positive material identification (PMI) device, an ultrasonic material integrity sensor, a penetrant testing (PT) device, and a coating thickness gauge, to perform the inspection under the control of the inspection circuit. In some embodiments, the inspection machine includes a laser scanner and possible camera for visual recognition and dimensional checking, mechanical testing tools for non-destructive testing (NDT), a PMI machine for material composition analysis, and a processing circuit configured (e.g., by code) to perform smart data analytics.

Using example embodiments for automated pipe inspection can lead to increased pipe reliability (e.g., compared to manual inspection), improved defect-free pipe manufacturing (e.g., from feedback of weak spots in pipe production and corrective action in response to the feedback), reduced inspection time and increased product quality compared to manual inspection, and the reduction or minimization of pipe deficiency reports. In comparison to manual inspection methods, example embodiments of the present disclosure help reduce labor costs, reduce or minimize working hours, reduce or minimize human error, increase product integrity, and reduce or minimize the chance of releasing defective pipes. This can lead to increased quality and customer satisfaction levels. It also helps support the progress of construction projects that rely on the pipes, and avoid maintenance work before starting the projects. Example embodiments of these features and techniques are illustrated in FIGS. 1-2D and described in the text that follows.

FIG. 1 is a block diagram of an example system 100 for automated inspection of a pipe 50 using artificial intelligence, according to an embodiment. Briefly, the inspection system 100 includes a sensor system 130 within a housing 140 that contains various sensors for performing the inspection of the pipe 50. The sensor system 130 uses a conveyor belt 135 and a position sensor 145 (e.g., a laser position sensor) to move and position the pipe 50 in relation to the sensors so that the sensors can inspect the pipe 50 in the desired locations. To this end, the inspection system 100 further includes a computing system 110 to perform and control the inspection in general, and more specifically to control the movement of the pipe with respect to the sensors and to control each of the individual sensors in the sensor system 130. The computing system communicates with the sensor system 130 through a communication link 128 (e.g., wired or wireless network, such as a local area network (LAN), a wide area network (WAN), or the Internet, to name a few).

In further detail, the sensor system 130 includes a laser scanner (such as a three-dimensional (3D) scanner) 150 coupled to the housing 140 and that performs initial (e.g., size) scanning of the pipe 50 under the control of the computing system 110. This is to recognize the type of the pipe 50 based on its scanned size using the computing system 110. The sensor system 130 also includes an RFID scanner (or RFID reader) 165 that reads information from an attached RFID tag on the pipe 50. The RFID tag identifies features of the pipe 50, such as its material or a link to the pipe's support document (e.g., on a cloud-based server). The support document may contain computer-readable text, or optical character recognition (OCR) technology may be applied to convert the support document into computer-readable text. Once the pipe type is identified, the pipe 50 undergoes dimensional scanning by the laser scanner 150 under the control of the computing system 110 in order to uncover any dimensional nonconformities (deviations from the standard dimensions) of the recognized pipe 50 from the standard dimensions of the same pipe type. In some embodiments, multiple laser scanners 150 (for instance, attached to the housing through corresponding robotic arms under the control of the computing system 110) are used to carry out the different laser scanning inspections. For ease of description, most of the processor and sensor types are discussed in the singular throughout, but in other embodiments, they can be replaced with multiple such processors or sensors to carry out the same tasks.

In addition, the sensor system 130 includes a positive material identification (PMI) machine 160 coupled to the housing 140 and that performs a material composition inspection of the pipe 50. The sensor system 130 further includes an ultrasonic material integrity sensor 170 coupled to the housing 140 and that performs an ultrasonic (non-destructive) material integrity inspection of the pipe 50. The sensor system 130 also includes a penetrant testing (PT) device 180 coupled to the housing 140 and that checks for any leaks in the pipe 50. Further, the sensor system 130 includes a coating thickness gauge 190 coupled to the housing 140 and that verifies any coatings of the pipe 50 are at acceptable thicknesses. Each of the sensors 160, 170, 180, 190 performs under the control of the computing system 110 to carry out its assigned inspection on the pipe 50. In some embodiments, each sensor is attached to the housing 140 through a corresponding robotic arm, and the computing system 110 is programmed to move the sensor to a sufficiently close proximity of the pipe 50 by controlling its corresponding arm.

To this end, the computing system 110 is configured (e.g., by code, logic, machine learning, and the like) to oversee the inspection of the pipe 50 and control the positioning apparatus (e.g., conveyor belt 135 and position sensor 145) and different inspection sensors 150, 160, 170, 180, and 190 that make up the sensor system 130. The computing system 110 can be local or remote (e.g., cloud-based) with respect to the sensor system 130. The computing system 110 can be a server, a cloud-based computing resource, a workstation, a laptop computer, or other computing device. In further detail, the computing system 110 includes an inspection circuit 105 for performing the computations and other logic. The inspection circuit 105 can be configured (e.g., by code or other logic) to perform the tasks assigned to it.

To this end, the computing system 110 includes an artificially intelligent module 108 trained by machine learning to recognize (such as categorize) pipes into their corresponding pipe types based on scanned size data (e.g., from laser scanner 150). For example, the artificially intelligent module can be built as an artificial neural network (ANN) using training data obtained from scanning (e.g., from a laser scanner) pipes of different types of interest to yield corresponding scanned size data of the different pipes. The artificially intelligent module 108 can then be trained using machine learning to recognize other pipes of these types. The artificially intelligent module 108 may be, for example, a separate circuit (such as a separate processor or custom logic circuit), part of the inspection circuit 105, or a different cloud-based resource, to name a few.

The computing system 110 also includes a database of current or ideal specifications 120 (or standards) of the different corresponding recognized pipe types. These represent desired fabrication standards together with acceptable tolerances (e.g., deviations) of those standards to produce acceptable pipes of the corresponding pipe type. In addition, the computing system 110 includes a database of historical data 125 including information on some or all of the deficient pipes inspected by this or similar inspection systems 100. In some embodiments, the historical data 125 maintains, for each pipe type, an inspection type (e.g., dimensional, material composition, material integrity, penetrant testing (PT), coating thickness, or the like), location, and severity of each deficiency observed in pipes of that pipe type as detected by, for example, the inspection system 100 on earlier inspections.

In some such embodiments, the inspection circuit is configured (e.g., by code) to bias the control of inspections of pipes of the same type as the historical data to more likely inspect areas that have a history of deficiencies. In some such embodiments, this bias is time-based, with the inspection circuit 105 being programmed to bias recent historical deficiencies more than older deficiencies. This allows the inspection circuit 105 to adapt to improved manufacturing resulting from uncovering the earlier deficiencies, while remaining diligent about checking for current deficiencies whose manufacturing process may not been adequately addressed.

In some embodiments, the inspection circuit 105 is programmed or otherwise configured to alert an operator of the inspection system 100 (such as through display device 115) of any detected nonconformities in the pipe being inspected. In some embodiments, the inspection circuit 105 is programmed to receive input from the operator, such as specifications for pipe types not recognized by the artificially intelligent module 108. This input can be provided by input device 118 (e.g., a keyboard, a mouse, a touchscreen, a voice recognition system, or the like).

In operation of some embodiments, the inspection circuit 105 is configured ((e.g., programmed) to control the conveyor belt 135 to bring the pipe 50 in close proximity to the laser scanner 150, to control the laser scanner 150 to obtain size data of the pipe 50, and to retrieve corresponding specifications and historical data of the pipe 50 from the specifications database 120 and historical database 125 by inputting the scanned size data to the artificially intelligent module 108. The inspection circuit 105 is further programmed to use the retrieved specification data and historical data to control each of the different inspections of the pipe 50 (from the different corresponding sensors). The inspection circuit 105 is further programmed to decide when such an inspection identifies a nonconformity to the specification data, and to take appropriate action based on the identified nonconformity, such as generating an alert or updating the historical data 125 to reflect the identified nonconformity.

The inspection circuit 105 can be implemented in a variety of ways, including hardware (e.g., custom logic circuits or customizable logic circuits such as programmable gate arrays), firmware, or software (e.g., computer instructions executable on a processing circuit such as an electronic processor or microprocessor). The described techniques herein can be implemented using a combination of sensors, cameras, and other devices including computing, control, or other logic circuits configured (e.g., programmed) to carry out their assigned tasks. These devices are located on or in (or otherwise in close proximity or coupled to) the housing 140 of the sensor system 130 for carrying out the techniques. In some example embodiments, the inspection circuit 105 is implemented as computer code configured to be executed on a computing circuit (such as a microprocessor) to perform the control steps that are part of the technique.

In an example embodiment, a technology mechanism is provided for automated inspection of a pipe using artificial intelligence. Referring to the components of FIG. 1, the inspection begins with selecting the pipe 50 to be inspected. The pipe 50 can be any recognized type, or even an unrecognized type for which specification data is available for manual input (e.g., from an operator). The selected pipe is placed on (such as attached to) the conveyor belt 135 for delivery and positioning into the sensor system 130. The inspection circuit 105 controls movement of the conveyor belt 135 (and attached pipe 50) to bring the pipe 50 to the sensor system 130, as detected by the position sensor 145 (or, in some embodiments, multiple position sensors 145). At this point, the pipe 50 is ready to be inspected.

The inspection begins with the laser scanner 150 (such as a 3D laser scanner, or a 3D laser scanner for the outer surface of the pipe 50 and a 3D laser for the inner surface of the pipe 50, or other such combination) performing a size scan of the pipe 50, such as length and width (diameter) of the pipe, or any other size data that distinguishes the pipe 50 from pipes of other types. Here, the laser scanner 150 is controlled by the inspection circuit 105, which is programmed to control the scanning operations of the laser scanner 150 to perform the different scans. The scanned data is sent to the computing system 110, which is programmed or otherwise configured to determine the type of the pipe 50 and with that, the corresponding specification (e.g., standards) and historical (e.g., observed nonconformity) data for the pipe type. For instance, in the computing system 110, the artificial intelligence module 108 is trained by machine learning to identify the type of pipe from the scanned size data, which is then used to index the corresponding specification from the specifications database 120 and the corresponding historical data from the historical data database 125.

The retrieved specification and historical data is then used by the inspection circuit 105 to control the inspection of the pipe 50 by the different sensors. For example, in some embodiments, the inspection circuit 105 is programmed to use the retrieved specification and historical data to control the inspection of the pipe 50 by the different sensors. In some embodiments, the specifications database 120 and the historical data database 125 are stored on cloud-based servers. In some embodiments, the database 120 includes a corresponding specification for each supported pipe type. Each specification includes information such as the international code for the pipe type, fabrication standards (e.g., materials, dimensions, construction, integrity) for the pipe type, and a drawing of the pipe type. The inspection circuit 105 is programmed to use these standards and other information in the specification as a baseline for evaluating sensor data of the pipe 50 from the different sensors of the sensor system 130 and deciding if the evaluated sensor data represents a conforming pipe (e.g., passes inspection) of a nonconforming pipe (e.g., fails inspection, generates a nonconformity).

In some embodiments, the historical data database 125 includes corresponding historical data for each supported pipe type. The historical data includes known nonconformities (e.g., inspection failures) for some example pipes of the pipe type. These inspection failures can be, for example, from earlier automated inspections, such as those conducted by the inspection system 100. The inspection circuit 105 is programmed to use this historical data to bias the automated inspections of new pipes of the same type (e.g., increase the likelihood of finding future such nonconformities, increase the confidence that further such defects are being reduced or eliminated, and the like).

In some embodiments, the inspection circuit 105 is cloud-based, such as being implemented as computer code stored on a non-transitory computer readable medium (CRM), as in a disk drive or flash drive. Here, the code is executed on a virtual server in the cloud to carry out the tasks of the inspection circuit 105. To this end, the server is connected with all inspection devices and includes an artificially intelligent module 108 trained by machine learning to recognize standard pipe types from scanned size data of the pipes. The inspection circuit 105 is further programed to collect inspection records, perform data analysis on the records, and generate corresponding reports of the inspections.

In some embodiments, the inspection circuit 105 is programmed to assemble the specification and historical data for the pipe 50, and arrange the specific inspections for the pipe 50 based on the assembled specification and historical data. In some embodiments, when the artificially intelligent module 108 is unable to recognize the pipe type of the pipe 50, a size nonconformity is detected and an alarm is generated, such as alerting an operator on the display device 115. At that point, the operator can provide the specification manually. This can happen, for instance, when the pipe type has a specification, but the artificially intelligent module 108 has not yet been trained (or sufficiently trained) to recognize the pipe type. The operator can then input the specification using, for example, the input device 118. In some embodiments, the historical data is disregarded (e.g., treated as none) when the specification is manually entered. In some embodiments, an RFID reader 165 can be used to identify the pipe type or specification (or specific fields of the specification) by recognizing an encoded form of this information embedded in an RFID tag attached to the pipe 50.

At this point, the various sensors in the sensor system 130 perform their inspections of the pipe 50 under the control of the inspection circuit 105, which is programmed to control the different sensors to perform their respective inspections. To this end, the historical data (when present) is used to bias the inspections (e.g., perform certain inspections more frequently, especially in areas of the pipe 50 where previous inspections of pipes of the same type had nonconformities). For instance, in some embodiments, the inspection circuit 105 is programmed to do in-depth inspections of areas where many nonconformities are detected from inspections of other pipes of the same type and material. In some embodiments, the inspection circuit 105 is programmed to display (e.g., on the display device 115) the nonconformity data for the pipe type currently being inspected by the inspection system 100. For example, this nonconformity display can serve as a proactive notification to the operator, allowing the operator to better prepare for or respond to the inspection data being generated by the inspection circuit 105 (e.g., on the display device 115) in response to the inspections of the various sensors of the sensor system 130 on the pipe 50.

While the inspection process is intended to be fully automated, in some embodiments, the inspection circuit 105 is programmed to receive input from the operator (e.g., through input device 118), such as to modify or override the planned inspections of the pipe 50. This can be, for example, in situations where the operator has more specialized knowledge of which particular inspections to perform or not perform than the computing system 110 has been programmed to ascertain from previous inspections of the same type of pipe.

In some embodiments, the inspection circuit 105 is programmed to begin the individual inspections with a laser scanning (such as a 3D laser scanning) to inspect the dimensions of the pipe 50. Here, the inspection circuit 105 is programmed to control the laser scanner 150 to perform a full visual and dimensional inspection of the pipe 50. Among other dimensional or visual measurements, these can include pipe length, straightness, outside circumference, wall thickness, out of roundness, peaking, bevel angel, root face, and bead height from grinding area and welded area. The inspection circuit 105 is further programmed to compare scanned dimensional measurements from the laser scanner 150 against the standard values for these dimensions based on the specification for the pipe type. If any of the scanned values fall outside the acceptable tolerances for the dimension being measured (e.g., as specified in the specification, such as 3% in either direction of ideal, or some other specified deviation), the inspection circuit 105 is programmed to detect a dimensional nonconformity. The inspection circuit 105 is further programmed to store such dimensional nonconformities in the historical data for this pipe type, such as in a dimensional nonconformities section with previous dimensional nonconformities detected for this pipe type. The inspection circuit 105 is further programmed to alert an operator of the nonconformity, so that the operator can take appropriate action (e.g., repair the defect, fail the inspection for the pipe 50, or that like).

In some embodiments, this inspection is supplemented with a camera 155, such as a digital or visible wavelength camera attached to the housing 140 through a robotic arm. The inspection circuit 105 is programmed to control the camera 155 to capture images of the pipe 50 for visual inspection. In some embodiments, the inspection circuit 105 is programmed to control the camera 155 to capture images of the outer and inner surfaces of the pipe 50, and to detect any nonconformity in either surface (such as by visual comparison), possibly supplemented by prior visual nonconformities in the historical data of the historical database 125. In some embodiments, the inspection circuit 105 is programmed to control the camera 155 to capture images of markings on the pipe 50, to compare the captured images with standard markings (e.g., as provided in the specification), to detect any nonconformity in the markings based on the comparison, and to generate an alert (or take other appropriate action) if such a mismatch is detected.

In some embodiments, if no nonconformity/deficiency is detected for the pipe 50 from the visual/dimensional inspection, the inspection circuit 105 is programmed to output the successful inspection results (e.g., acceptable dimensional measurements) on the display device 115. In some embodiments, the inspection circuit 105 is programmed to generate an inspection report of the dimensional inspection. In some embodiments, the inspection circuit 105 is programmed to use the 3D scanned data from the laser scanner 150 in order to recognize (e.g., map, describe) the pipe surface to support consistently finding locations on the pipe 50 automatically.

In some embodiments, the inspection circuit 105 is further programmed to carry out other inspections of the pipe 50 using the different sensors of the sensor system 130. These further inspections can include, for example, a material composition inspection using the positive material identification (PMI) machine 160, a material integrity inspection using the ultrasonic material integrity sensor 170, a penetrant testing (PT) inspection using the PT device 180, and a coating thickness inspection using the coating thickness gauge 190. Each of these sensors can be coupled to the housing 140 using, for example, a robotic or hydraulic arm configured to manipulate the position of the sensor to the desired location on the pipe 50. To this end, the inspection circuit 105 is configured to use or control the conveyor belt 135, the position sensor 145, the 3D laser scan of the pipe 50, and the individual arms of the sensors to position the pipe 50 relative to the sensor in order to perform the sensor's inspection at the appropriate location or locations on the pipe 50.

In some embodiments, the next inspection performed by the inspection system 100 is to determine the chemical or material composition of the pipe 50 (for example, a percentage breakdown of chemical elements such as carbon or other materials) using a spectrometer PMI machine (such as PMI machine 160). In some such embodiments, the inspection circuit 105 is programmed to control the PMI machine 160 through a hydraulic arm in order to move the PMI machine 160 relative to the surface of the pipe 50 (using the 3D scan data) and measure the chemical compositions at multiple locations of the pipe 50. The inspection circuit 105 is further programmed to compare these measured compositions with acceptable standard compositions (as specified, for example, in the specification for the pipe type), and to select multiple such inspection locations on the pipe (such as randomly), with possible input from the specification (in the specifications database 120) or historical data (in the historical data database 125). Based on these comparisons, the inspection circuit 105 is further programmed to detect any material composition nonconformity in the tested portions of the pipe 50, and to take further steps (e.g., alert the operator, update the material composition portion of the historical data for this pipe type to reflect the detected nonconformity) if such a nonconformity is detected.

In some embodiments, if the pipe 50 passes the material composition inspection, the inspection circuit 105 is programmed to perform an ultrasonic test inspection using the ultrasonic material integrity sensor 170, such as a phased array ultrasonic test (PAUT) detector. The ultrasonic test (UT) inspection is a nondestructive testing (NDT) technique that uses sound waves to analyze the pipe 50 for structural defects such as cracks. The PAUT detector can detect weaknesses in material integrity such as in welds. In some such embodiments, the inspection circuit 105 is configured to control the manipulation (e.g., using a hydraulic arm) and operation of the PAUT detector to inspect the pipe 50 from beginning to end. In further detail, the inspection circuit 105 is programmed to use the specification, the 3D scanning data, and the UT historical data for the pipe type to guide the manipulation and operation of the ultrasonic material integrity sensor 170. The inspection circuit 105 is further configured to pass the material integrity inspection for the pipe 50 in response to no nonconformities (all UT measurements conforming to design standards) being detected during the UT inspection. This helps to ensure material integrity and that the pipe 50 is free of cracks and other structural defects.

To this end, the inspection circuit 105 is configured (e.g., programmed) to receive the PAUT inspection data from the various locations being tested on the pipe 50, compare the received inspection data with standards for the pipe type (e.g., as specified in the specification), and detect any nonconformities. The inspection circuit 105 is further configured or programmed to, for example, alert such nonconformities to the operator, display them on the display device, update the UT portion of the historical data for the pipe type to reflect the nonconformities, and fail the inspection.

In some embodiments, the inspection circuit 105 is programmed to perform the penetrant testing (PT) inspection next using the PT machine (or device) 180 and the camera 155, each of which may be on their own hydraulic arm (under control of the inspection circuit 105) to maneuver where needed on or near the pipe 50. The PT device 180 is another sensor that checks for material integrity of the pipe 50 by inspecting random locations on the pipe 50 for deficiencies such as cracks. The inspection circuit 105 is programmed to perform the PT inspection by controlling the manipulation and operation of the PT device 180 to perform the PT inspection at various (e.g., random) points on the pipe 50 using the PT portion of the historical data for the pipe type in order to bias the location choices based on where previous PT nonconformities have been detected on pipes of the same type. The inspection circuit 105 is programmed to receive the PT inspection results from the PT device 180 and camera 155, compare the results to PT standards for the pipe type, and detect any nonconformities based on the comparisons. If any PT nonconformities are detected, the inspection circuit 105 is further programmed to generate an alarm and update the PT section of the historical data for the pipe type to reflect the PT nonconformities.

In some embodiments, the inspection circuit 105 is programmed to perform the dry film (or coating) thickness inspection using the coating thickness gauge 190. In some such embodiments, the coating thickness gauge 190 is connected to the housing 140 using a hydraulic arm controlled by the inspection circuit 105. The inspection circuit 105 is further programmed to manipulate the location of the coating thickness gauge to various (e.g., random) locations on the pipe 50 using the hydraulic arm. The coating thickness gauge 190 verifies that any coatings or dry films on the pipe 50 are of acceptable thicknesses. To this end, the inspection circuit 105 is programmed to use the specification to compare measured coating thicknesses of the pipe 50 to acceptable standards, to detect any dry film or coating thickness nonconformities based on these comparisons, and to generate an alert and update the coating thickness portion of the historical data for the pipe type to reflect the nonconformities.

In some embodiments, the inspection circuit 105 is programmed to stop and fail the inspection when nonconformities are detected. In this fashion, such nonconformities can be addressed (e.g., justified, repaired, salvaged, disposed) when they are detected, which leads to better quality inspection systems, inspection methods, and inspected pipes. In some embodiments, the inspection circuit 105 is programmed to generate a report of the inspection results, including measurements, standards/tolerances, and nonconformities. In some such embodiments, these reports are stored, such as on a cloud server or other non-transitory storage device, for later retrieval (e.g., data mining, process improvement analysis, postmortem investigation, and the like). In some embodiments, the inspection circuit 105 is programmed to pass any pipe for which no nonconformities are detected, such as control the conveyor belt to move the pipe 50 to the other side of the sensor system from which it was loaded, or to a location different from the location failing pipes are sent.

FIGS. 2A-2D are flow diagrams of an example method 200 for automated inspection of a pipe (such as pipe 50) using artificial intelligence, according to an embodiment. The method 200 is automated in a sense that a computer, computing system (such as computing system 110), or other electronic logic device performs or controls the performance of the inspection method, without requiring human input. While human input may be referred to during the description of parts of the method 200, humans do not perform any of the steps making up the method 200.

Some or all of the method 200 can be performed using components and techniques illustrated in FIG. 1. In addition, portions of this and other methods disclosed herein can be performed on or using process control logic, such as custom or preprogrammed control logic devices, circuits, or processors, as in a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause portions of the method 200 (or other disclosed method) to be carried out. It should be noted that in other embodiments, the order of the operations can be varied, and that some of the operations can be omitted. Some of the method 200 can also be performed using logic, circuits, or processors located on or in electrical communication with a processing circuit configured by code to carry out these portions of the method 200.

With reference to FIG. 2A, in the method 200, processing begins with the step of positioning 210 the pipe with respect to a laser scanner (such as laser scanner 150) using a positioning apparatus (such as conveyor belt 135 and position sensor 145). The method 200 further includes the step of controlling 220, by an inspection circuit (such as inspection circuit 105), a scanning of a size (such as length, diameter, and the like) of the positioned pipe by the laser scanner. In addition, the method 200 includes the step of identifying 230, by the inspection circuit, a specification and historical data of a type of the pipe by inputting the scanned size to an artificially intelligent module (such as artificially intelligent module 108) trained through machine learning to match input size data to standardized pipe types and output corresponding specifications (such as from specifications database 120) and historical data (such as from historical data database 125) of the standardized pipe types from a non-transitory memory device (such as one or more disk drives storing the specifications database 120 and the historical data database 125).

The method 200 also includes the step of controlling 250, by the inspection circuit, a scanning of dimensions (such as length, straightness, outside circumference, wall thickness, squareness, out of roundness, peaking, bevel angel, and welded area) of the positioned pipe by the laser scanner using the scanned size and a dimension portion (such as previous dimension nonconformities for pipes of the same pipe type) of the identified historical data. Further, the method 200 includes the step of comparing 255, by the inspection circuit, the scanned dimensions with standard dimensions from the identified specification. In addition, the method 200 includes the step of detecting 260, by the inspection circuit, a dimension nonconformity of the pipe when the scanned dimensions are not within acceptable tolerances of the standard dimensions (such as within a few percent, or within tolerances specified in the specification). In response to detecting the dimension nonconformity, the method 200 further includes the steps of generating 265, by the inspection circuit, an alert (such as to an operator, or to the display device 115), and updating, by the inspection circuit, the memory device to reflect the detected dimension nonconformity in the dimension portion of the identified historical data (such as incorporate the details of this nonconformity into the set of previously detected nonconformities of pipes of the same type).

Continuing with FIG. 2B, the method 200 further includes, for each remaining inspection (such as material composition, material integrity, penetrant testing, and coating thickness), the step of repeating 270 the steps of controlling 250, comparing 255, detecting 260, and alerting/updating 265 for different inspections of the pipe using different corresponding inspection devices (such as PMI machine 160, material integrity sensor 170, PT device 180, and coating thickness gauge 190), portions of the identified historical data (such as previous material composition nonconformities, material integrity nonconformities, PT nonconformities, and coating thickness nonconformities), and standards in the identified specification (such as material composition standards, material integrity standards, PT standards, and coating thickness standards).

In addition, the method 200 includes, for each remaining inspection, the step of using 280 the detected previous nonconformities of identified historical data to adjust the controlling of the present inspections of the pipe in order to detect more such previous nonconformities (such as increasing the amount or likelihood of inspecting the locations of previous nonconformities of the pipe type on the present pipe). Further, the method 200 includes, for each remaining inspection, the step of updating 290 the memory device to reflect any detected present nonconformities in the identified historical data such that future inspections of further pipes of the pipe type are more likely to detect further such present nonconformities than if no such updating took place.

Continuing with FIG. 2C, the artificially intelligent module is further trained to recognize when the input size data does not match to any of the standardized pipe types. In addition, the method 200 includes the step of detecting 240, by the inspection circuit, a size nonconformity of the pipe when such a mismatch is recognized by the artificially intelligent module. In response to detecting the size nonconformity, the method 200 further includes the step of retrieving 242, by the inspection circuit, the specification from an external source (such as the operator through input device 118). The method 200 also includes the step of resuming 244 normal inspection processing (for example, with step 250) using the retrieved specification and no historical data (such as no previous nonconformities) for the pipe type.

Continuing with FIG. 2D, in some embodiments, the step of positioning 210 the pipe with respect to the laser scanner using the positioning apparatus is implemented using the conveyor belt 135 and the position sensor 145 as the positioning apparatus. In addition, the method 210 includes the steps of controlling 212, by the inspection circuit, movement of the pipe with respect to the laser scanner using the conveyor belt; detecting 214, by the inspection circuit, a position of the moving pipe with respect to the laser scanner using the position sensor; and stopping 216, by the inspection circuit, the moving of the pipe with respect to the laser scanner (such as stopping the conveyor belt 135) in response to the detected position.

Any of the methods described herein may, in corresponding embodiments, be reduced to a non-transitory computer readable medium (CRM) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing,"

"involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method of inspecting a pipe using artificial intelligence, the method comprising:

positioning the pipe with respect to a laser scanner using a positioning apparatus;

controlling, by an inspection circuit, a scanning of a size of the positioned pipe by the laser scanner;

identifying, by the inspection circuit, a specification and historical data of a type of the pipe by inputting the scanned size to an artificially intelligent module trained through machine learning to match input size data to standardized pipe types and output corresponding specifications and historical data of the standardized pipe types from a non-transitory memory device;

controlling, by the inspection circuit, a scanning of dimensions of the positioned pipe by the laser scanner using the scanned size and a dimension portion of the identified historical data;

comparing, by the inspection circuit, the scanned dimensions with standard dimensions from the identified specification;

detecting, by the inspection circuit, a dimension nonconformity of the pipe when the scanned dimensions are not within acceptable tolerances of the standard dimensions; and in response to detecting the dimension nonconformity, generating, by the inspection circuit, an alert, and updating, by the inspection circuit, the memory device to reflect the detected dimension nonconformity in the dimension portion of the identified historical data.

2. The method of claim 1, wherein the identified historical data comprises nonconformities of pipes of the pipe type detected from previous inspections of the pipes, and the method further comprises:

using, by the inspection circuit, the detected previous nonconformities of the identified historical data to adjust controlling of present inspections of the pipe in order to detect more such previous nonconformities; and updating, by the inspection circuit, the memory device to reflect any detected present nonconformities in the identified historical data such that future inspections of further pipes of the pipe type are more likely to detect further such present nonconformities than if no such updating took place.

3. The method of claim 1, further comprising:

controlling, by the inspection circuit, an inspection of the material composition of the pipe by a positive material identification (PMI) machine using the scanned size and a material composition portion of the identified historical data;

comparing, by the inspection circuit, the inspected material composition with a standard material composition from the identified specification;

detecting, by the inspection circuit, a material composition nonconformity of the pipe when the inspected material composition is not within acceptable tolerances of the standard material composition; and in response to detecting the material composition nonconformity, generating, by the inspection circuit, an alert, and updating, by the inspection circuit, the memory device to reflect the detected material composition nonconformity in the material composition portion of the identified historical data.

4. The method of claim 1, further comprising:

controlling, by the inspection circuit, an inspection of a material integrity of the pipe by an ultrasonic material integrity sensor using the scanned size and a material integrity portion of the identified historical data;

comparing, by the inspection circuit, the inspected material integrity with a standard material integrity from the identified specification;

detecting, by the inspection circuit, a material integrity nonconformity of the pipe when the inspected material integrity is not within acceptable tolerances of the standard material integrity; and in response to detecting the material integrity nonconformity, generating, by the inspection circuit, an alert, and updating, by the inspection circuit, the memory device to reflect the detected material integrity nonconformity in the material integrity portion of the identified historical data.

5. The method of claim 1, further comprising:

controlling, by the inspection circuit, a penetrant testing (PT) inspection of the pipe by a PT device and a camera using the scanned size and a PT portion of the identified historical data;

comparing, by the inspection circuit, the PT inspection of the pipe with a standard PT inspection from the identified specification;

detecting, by the inspection circuit, a PT nonconformity of the pipe when the PT inspection of the pipe is not within acceptable tolerances of the standard PT inspection; and in response to detecting the PT nonconformity, generating, by the inspection circuit, an alert, and updating, by the inspection circuit, the memory device to reflect the detected PT nonconformity in the PT portion of the identified historical data.

6. The method of claim 1, further comprising:

controlling, by the inspection circuit, a coating thickness inspection of the pipe by a coating thickness gauge using the scanned size and a coating thickness portion of the identified historical data;

comparing, by the inspection circuit, the inspected coating thickness with a standard coating thickness from the identified specification;

detecting, by the inspection circuit, a coating thickness nonconformity of the pipe when the inspected coating thickness is not within acceptable tolerances of the standard coating thickness; and in response to detecting the coating thickness nonconformity, generating, by the inspection circuit, an alert, and updating, by the inspection circuit, the memory device to reflect the detected coating thickness nonconformity in the coating thickness portion of the identified historical data.

7. The method of claim 1, wherein the artificially intelligent module is further trained to recognize when the input size data does not match to any of the standardized pipe types, and the method further comprises:

detecting, by the inspection circuit, a size nonconformity of the pipe when such a mismatch is recognized by the artificially intelligent module; and in response to detecting the size nonconformity, retrieving, by the inspection circuit, the specification from an external source.

8. The method of claim 1, wherein the positioning apparatus comprises a conveyor belt and a position sensor, the pipe is on the conveyor belt, and positioning the pipe with respect to the laser scanner comprises:

controlling, by the inspection circuit, movement of the pipe with respect to the laser scanner using the conveyor belt;

detecting, by the inspection circuit, a position of the moving pipe with respect to the laser scanner using the position sensor; and stopping, by the inspection circuit, the moving of the pipe with respect to the laser scanner in response to the detected position.

9. A system for automated inspection of a pipe using artificial intelligence, the system comprising:

a housing;

a positioning apparatus configured to position the pipe with respect to the housing;

a laser scanner coupled to the housing and configured to scan a size and dimensions of the positioned pipe;

a camera coupled to the housing and configured to capture images of the positioned pipe;

an artificially intelligent module trained through machine learning to match input size data to standardized pipe types and output corresponding specifications and historical data of the standardized pipe types from a non-transitory memory device; and an inspection circuit configured to:

control the scanning of the size of the positioned pipe by the laser scanner and the capturing of images of the positioned pipe by the camera;

identify a specification and historical data of a type of the pipe by inputting the scanned size to the artificially intelligent module;

control the scanning of the dimensions of the positioned pipe by the laser scanner using the scanned size and a dimension portion of the identified historical data;

compare the scanned dimensions and the captured images with standard dimensions from the identified specification;

detect a dimension nonconformity of the pipe when the scanned dimensions or the captured images are not within acceptable tolerances of the standard dimensions; and in response to detecting the dimension nonconformity, generate an alert and update the memory device to reflect the detected dimension nonconformity in the dimension portion of the identified historical data.

10. The system of claim 9, wherein the identified historical data comprises nonconformities of pipes of the pipe type detected from previous inspections of the pipes, and the inspection circuit is further configured to:

use the detected previous nonconformities of the identified historical data to adjust controlling of present inspections of the pipe in order to detect more such previous nonconformities; and update the memory device to reflect any detected present nonconformities in the identified historical data such that future inspections of further pipes of the pipe type are more likely to detect further such present nonconformities than if no such updating took place.

11. The system of claim 9, further comprising a positive material identification (PMI) machine coupled to the housing and configured to inspect a material composition of the pipe, wherein the inspection circuit is further configured to:

control the inspection of the material composition of the pipe by the PMI machine using the scanned size and a material composition portion of the identified historical data;

compare the inspected material composition with a standard material composition from the identified specification;

detect a material composition nonconformity of the pipe when the inspected material composition is not within acceptable tolerances of the standard material composition; and in response to detecting the material composition nonconformity, generate an alert and update the memory device to reflect the detected material composition nonconformity in the material composition portion of the identified historical data.

12. The system of claim 9, further comprising an ultrasonic material integrity sensor coupled to the housing and configured to inspect a material integrity of the pipe, wherein the inspection circuit is further configured to:

control the inspection of the material integrity of the pipe by the ultrasonic material integrity sensor using the scanned size and a material integrity portion of the identified historical data;

compare the inspected material integrity with a standard material integrity from the identified specification;

detect a material integrity nonconformity of the pipe when the inspected material integrity is not within acceptable tolerances of the standard material integrity; and in response to detecting the material integrity nonconformity, generate an alert and update the memory device to reflect the detected material integrity nonconformity in the material integrity portion of the identified historical data.

13. The system of claim 9, further comprising a penetrant testing (PT) device coupled to the housing and configured to perform a PT inspection of the pipe with the camera, wherein the inspection circuit is further configured to:

control the PT inspection of the pipe by the PT device and the camera using the scanned size and a PT portion of the identified historical data;

compare the PT inspection of the pipe with a standard PT inspection from the identified specification;

detect a PT nonconformity of the pipe when the PT inspection of the pipe is not within acceptable tolerances of the standard PT inspection; and in response to detecting the PT nonconformity, generate an alert and update the memory device to reflect the detected PT nonconformity in the PT portion of the identified historical data.

14. The system of claim 9, further comprising a coating thickness gauge coupled to the housing and configured to perform a coating thickness inspection of the pipe, wherein the inspection circuit is further configured to:

control the coating thickness inspection of the pipe by the coating thickness gauge using the scanned size and a coating thickness portion of the identified historical data;

compare the inspected coating thickness with a standard coating thickness from the identified specification;

detect a coating thickness nonconformity of the pipe when the inspected coating thickness is not within acceptable tolerances of the standard coating thickness; and in response to detecting the coating thickness nonconformity, generate an alert and update the memory device to reflect the detected coating thickness nonconformity in the coating thickness portion of the identified historical data.

15. The system of claim 9, wherein the artificially intelligent module is further trained to recognize when the input size data does not match to any of the standardized pipe types, and the inspection circuit is further configured to:

detect a size nonconformity of the pipe when such a mismatch is recognized by the artificially intelligent module; and in response to detecting the size nonconformity, retrieve the specification from an external source.

16. The system of claim 9, wherein the positioning apparatus comprises:

a conveyor belt configured to move the pipe with respect to the housing; and a position sensor coupled to the housing and configured to detect a position of the moving pipe with respect to the housing, wherein the inspection circuit is further configured to control the conveyor belt in order to move the pipe with respect to the housing, and to stop the moving of the pipe with respect to the housing in response to the detected position.

17. A non-transitory computer readable medium (CRM) having computer instructions stored therein that, when executed by a processing circuit, cause the processing circuit to carry out an automated process of inspecting a pipe using artificial intelligence, the process comprising:

controlling a scanning of a size and an appearance of the pipe by a laser scanner and a camera, the pipe having been positioned with respect to the laser scanner and the camera using a positioning apparatus;

identifying a specification and historical data of a type of the pipe by inputting the scanned size and appearance to an artificially intelligent module trained through machine learning to match input size and appearance data to standardized pipe types and output corresponding specifications and historical data of the standardized pipe types from a non-transitory memory device;

controlling a scanning of dimensions of the positioned pipe by the laser scanner using the scanned size and a dimension portion of the identified historical data;

comparing the scanned dimensions with standard dimensions from the identified specification;

detecting a dimension nonconformity of the pipe when the scanned dimensions are not within acceptable tolerances of the standard dimensions; and in response to detecting the dimension nonconformity, generating an alert and updating the memory device to reflect the detected dimension nonconformity in the dimension portion of the identified historical data.

18. The CRM of claim 17, wherein the identified historical data comprises nonconformities of pipes of the pipe type detected from previous inspections of the pipes, and the process further comprises:

using the detected previous nonconformities of the identified historical data to adjust controlling of present inspections of the pipe in order to detect more such previous nonconformities; and updating the memory device to reflect any detected present nonconformities in the identified historical data such that future inspections of further pipes of the pipe type are more likely to detect further such present nonconformities than if no such updating took place.

19. The CRM of claim 17, wherein the process further comprises:

controlling an inspection of a material integrity of the pipe by an ultrasonic material integrity sensor using the scanned size and a material integrity portion of the identified historical data;

comparing the inspected material integrity with a standard material integrity from the identified specification;

detecting a material integrity nonconformity of the pipe when the inspected material integrity is not within acceptable tolerances of the standard material integrity; and in response to detecting the material integrity nonconformity, generating an alert and updating the memory device to reflect the detected material integrity nonconformity in the material integrity portion of the identified historical data.

20. The CRM of claim 17, wherein the positioning apparatus comprises a conveyor belt and a position sensor, the pipe is on the conveyor belt, and the process further comprises positioning the pipe with respect to the laser scanner using the positioning apparatus by:

controlling movement of the pipe with respect to the laser scanner using the conveyor belt;

detecting a position of the moving pipe with respect to the laser scanner using the position sensor; and stopping the moving of the pipe with respect to the laser scanner in response to the detected position.

* * * * *